INVENTORS.
MARCEL HUEPGEN
GERARD BERTAUX

United States Patent Office 2,725,416
Patented Nov. 29, 1955

2,725,416

HIGH TENSION ELECTRIC CABLES

Marcel Heupgen and Gerard Bertaux, Jeumont, France, assignors to Societe Anonyme dite: Forges et Ateliers de Constructions Electriques de Jeumont, Paris, France, a corporation of France Application October 15, 1951, Serial No. 251,276

Claims priority, application France October 19, 1950

7 Claims. (Cl. 174—13)

The present invention relates to fluid-filled electric cables for high or very high tension, comprising means for compensating the expansion and contraction of the filling oil or insulating compound. Known compensating means can be divided into two groups: In the first, which is outside the scope of the present invention, the lead sheath of the cable is utilized itself as an elastic container. In the second group, the lead sheath is not deformed by internal pressure but the cables comprise external or internal pressure compensating devices.

The invention relates to electric cables provided with internal compensators which present numerous advantages, particularly the absence of movements of the filling or impregnation fluid in the longitudinal direction of the cable.

In connection with this second group of compensating devices, there have been advanced numerous suggestions which, in spite of their great variety, have not hitherto given rise to practical embodiments.

It has been proposed to lodge, in the interior of the cable, gas-filled compensating cells surrounded by perforated protective housings, but the deformations of these cells are not free from friction, that is, these compensators are very liable to damage; the cables do not have enough radial rigidity and the internal pressures of each cell cannot be separately adjusted according to the service conditions. On the other hand, the manufacture of such cables is difficult and expensive and the cables are not sufficiently flexible.

Other known devices of this kind also present drawbacks which prevent their practical use.

The present invention has for its object to eliminate the drawbacks of the known internal compensation devices.

It provides for the practical and economical manufacture of reliable, radially rigid, but flexible cables, operating without longitudinal displacement of the impregnation fluid and without external devices for regulation of pressure.

The cable according to the invention, comprises at least one flexible core formed by relatively short tubular very rigid containers of substantially cylindrical form set end to end and provided with openings for the radial circulation of the impregnating fluid, and a plurality of elastic compensation devices of the fluid-tight type arranged inside these containers so as to be protected completely thereby, these devices being arranged to operate without any friction and to allow their preliminary filling with gas under a desired and adjustable pressure.

The elements can be tubular and arranged to form a flexible longitudinal tunnel or chain, optionally provided with transverse partitions, or else they form a chain of separate cylindrical boxes.

They are provided with mechanical linking means formed by stranded conductors surrounding said chain, or by insertion members arranged to allow relative angular movements of one element in relation to another.

Each of the elastic compensating devices has the form of a longitudinal gas-filled bellows, this bellows having one closed end which is movable freely and without friction in the interior of the respective tubular element as far as an axial stop, while its other end is attached in a fluid-tight manner to a transverse wall of the tubular element. This transverse wall preferably comprises means for the accurate centering of the bellows, for its fluid-tight fixing, for its adjustable filling and for the mechanical interlinking of the adjacent elements of the core.

The chain of tubular elements with the enclosed bellows can act as a rigid supporting core for the stranded conductor; according to a modification, this chain of elements and bellows can be lodged inside a flexible pipe which is laid and twisted with two or more conductors, the whole being enclosed in a common sheath.

The invention is hereinafter described with reference to the accompanying drawings which illustrate a number of embodiments, given by way of example.

Referring to these drawings: Fig. 1 is a fragmentary longitudinal section through a cable having a central core in the form of a channel.

Figure 6:
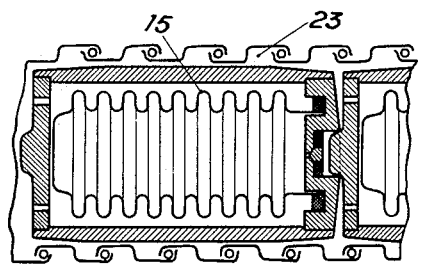
Figure 7:
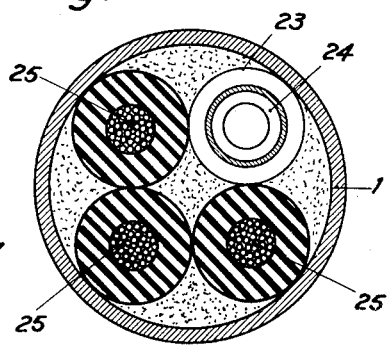

Figs. 6 and 7 relate to cables with helical or non-axial arrangement of the tubular elements.

Figure 8:
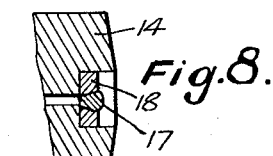

Fig. 8 shows in detail the sealing means.

Figure 1:
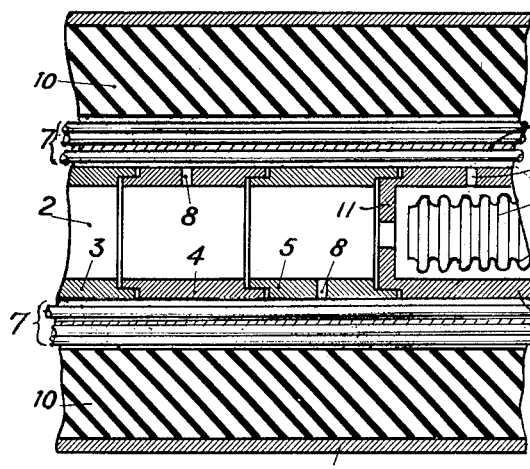

Fig. 1 shows, in the longitudinal section, a single-core cable having a lead sheath 1. In the centre of this cable is a channel 2, formed by a chain of tubular elements 3, 4, 5, etc., all being relatively short and rigid, and fitted or jointed together at their extremities, as represented.

These joints comprise a slight play, in order to allow the passage of the fluid in the transverse direction and to provide the necessary flexibility, particularly when the cable is bent or curved. These joints also facilitate the setting in place of the said relatively short elements in the interior of the stranded conductor 7 during the manufacture and stranding of the cable. In order to facilitate the circulation of the fluid, there can also be provided openings 8, as shown.

The internal walls of the channel are smooth and without set-off or step from one tube element to the next. This channel allows of accommodating, in all security, the appropriate compensating devices described hereinafter; its walls constitute, in fact, a protective enclosure of unfailing rigidity and at the same time the channel or tunnel thus formed constitutes a central core for the effective support of the stranded conductor 7. In the body of this conductor, for example over the first layer of its strands surrounding the flexible core formed by the tubular elements 3, 4, 5, etc., there may be placed a very thin metal ribbon 9, made of brass for example, with a view to facilitating the proper positioning of these strands and their satisfactory behavior in the course of the manufacture. The insulating layer of the cable is represented at 10.

The tunnel or channel 2 may extend over the whole length of the cable; it may alternatively be divided into a number of compartments, when certain of its elements, or even all its elements, comprise, like the element 6, a transverse wall 11. The presence of these transverse walls has in particular for effect to increase substantially the radial rigidity of the tunnel, which allows of reducing the thickness of its walls and consequently the diameter of the cable, as well as its cost.

The compensation devices, which will be described hereinafter, are lodged either in the interior of the continuous tunnel, or else in the interior of its divisions or compartments, or again in the interior of separate boxes when the tubular elements take that form.

Figure 2:
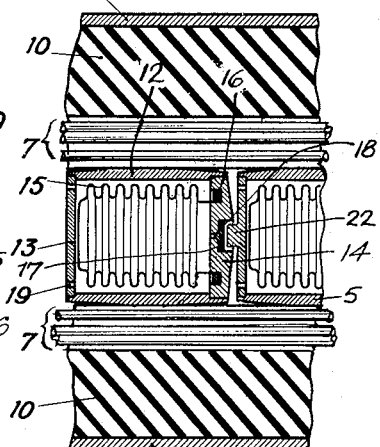
Fig. 2 is a corresponding view, partly in elevation, of an analogous cable of which the central core is formed by metallic boxes set end to end.

This form is shown in Fig. 2; instead of the elements 4 or 6, there are arranged in the interior of the cable a series of cylindrical boxes, each formed by a metallic tubular element 12 of which the external generatrix is preferably cambered slightly, and by two end walls 13 and 14 of which one at least presents a slightly convex external surface, in order that the mechanical forces acting in the course of manufacture or upon bending of the cable shall be brought towards the longitudinal axis; it results from this that during the bending of the cable its neutral fibre is located always at its very axis.

Figure 3:
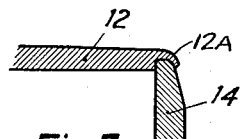
Fig. 3 is a fragmentary sectional view of a detail of Fig. 2.

The end walls 13 and 14 can be force-fitted, screwed, welded or fixed by any other means upon the elements 12; Fig. 3 represents by way of example the fixing of the end wall 14 by a crimp 12A over the edge of the element 12.

A pressuring compensating bellows 15, which preferably, is of the type closed at one of its ends, is welded or otherwise attached as an overhang on the end wall 14, which comprises for this purpose a concentric groove 16 to facilitate the fixing of the bellows by welding for example, in the exactly coaxial position, and in perfect fluid-tightness.

In the interior of the bellows, there is established a desired gaseous pressure which may vary for example between 0.5 and 15 kilograms per square centimeter. As shown more clearly in Fig. 8, a sealing element 18 is secured by soldering or welding at 17 upon the fixed end of the wall 14; it allows the convenient introduction of an appropriate gas and sealing of the bellows 15 under a desired pressure. In the end wall 13, there can be pierced holes 19 which give passage to the insulating fluid as the bellows expands and contracts. It is to be noted that the bellows 15 moves in the axial direction without the least friction, which protects it against wear, and that its expansion stroke is limited by the end wall 13, which forms a rigid abutment, thus limiting the deformation of the metal of the bellows.

It is seen that in this construction, the compensating device is completely protected against all external forces and that it has the form of a series of shrouded bellows, arranged as a rigid supporting core for the stranded conductor 7, and that the individual elements 12 are maintained in axial alignment by the stranded conductor 7, which surrounds them concentrically.

Figure 4:
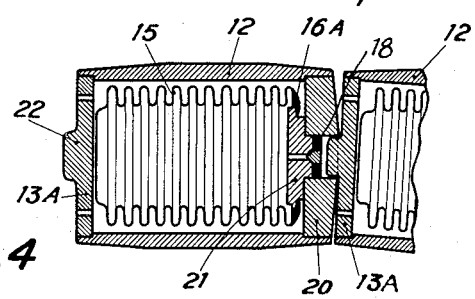
Figs. 4 and 5 are similar views of modifications of the construction according to Fig. 2.

In Fig. 4 which is a modification of Fig. 2, this axial alignment is secured by additional means: the bellows 15 is closed by a cap 21 distinct from the end wall 20 of the tubular element or box, and, carrying a similar sealing element 18 welded to the elements 20 and 21, the bellows-cap joint designated by 16A is arranged differently from but just as effectively as the preceding one. One of the end walls of the cylindrical box, for example that which is designated by 13A, is provided with a central boss 22, which as is shown in Fig. 2 or Fig. 4, fits into the central orifice of the end wall 14 or 20 of the adjacent box. This boss 22 facilitates if necessary the setting in place of the shrouded bellows assembly 12, 15, at the moment of its introduction into the first layer of the wires 7 in formation of the stranded conductor.

The length of the elementary devices represented in Figs. 2 and 4 can vary within wide limits. From the economical point of view, it is beneficial to increase such length so as to reduced the number of these devices, and consequently the cost of the cable; this length will be limited in practice by the admissible radius of curvature of the cable.

Figure 5:
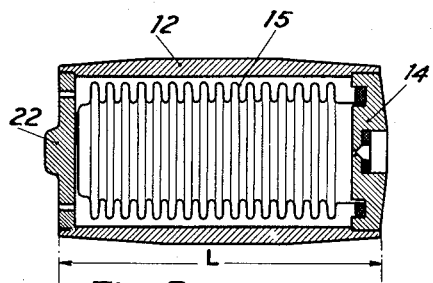

Fig. 5 represents by way of example such an elementary device elongated to a length L; it is analogous with that of Fig. 2 and has the same sealing means, but comprises the centering boss 22 of Fig. 4. This boss is particularly advantageous when the length L is great; the tube 12 is cambered in the longitudinal direction in order to facilitate its inscription in the arc formed by the cable when curved or bent, and its correct position is better ensured by the kinematic connection afforded by the boss 22, between the elements.

The above examples relate to cables with a single conductor, having a central compensation core. Fig. 6 shows how the shrouded compensation bellows comprising the same sealing means as above can be arranged in a three-core cable.

The bellows are first placed end to end, one behind another, in the interior of a flexible tube or pipe 23 of any conventional type, metallic for example, the pipe being slightly tensioned. There have been represented in the interior of this pipe 23 one complete bellows of the kind shown in Fig. 5 and a part of a second such bellows; there could likewise have been introduced therein a number of bellows of the kinds shown in Figs. 2 and 4 or their modifications. The flexible pipe 23, provided with appropriate apertures for the circulation of fluid under pressure and containing the shrouded bellows, is thereafter twisted with the three insulated conductors 25, and the whole is covered with a lead sheath 1, as shown in Fig. 7 which represents such a cable in transverse section.

The flexible pipe 23 with its bellows 24 is located in one quadrant and the insulated conductors 25 in the other three quadrants. Instead of the metallic pipe 23 represented in Figs. 6 and 7, there can likewise be used a tubular envelope made of any suitable flexible material, or else a metal ribbon wound helically. It will be noted that the radial rigidity of this flexible pipe, envelope or ribbon to deformation by the gas pressure is, because of the shrouded bellows which consolidate it internally, at least as great as that of the insulated conductors. The tubular elements therefore ensure, simultaneously, both the satisfactory behavior of the three-core cable and the complete mechanical protection of the compensation bellows.

It is obvious that the devices which have been described by way of illustration only, can be modified in various minor ways. It is possible, for example, to manufacture the cylindrical boxes by pressing or die-stamping and to give them different shapes.

It is seen that the invention described above and its various modifications, allow the simple and effective manufacture of shrouded compensating bellows, arranged to support the stranded conductor or conductors. These supports are indeformable, while yet allowing the bending or curvature of the cable. The elastic bellows completely protected by the tubular elements or boxes are arranged so as to eliminate all friction and rubbing, and their expansional strokes are limited by rigid stops, which excludes all possibility of excessive fatigue of the metal.

These results are obtained by the fixing of the bellows as an overhang from one end of the tubular element and by their exact centering, as well as by the arrangement of the compartments which enclose them so as to eliminate any excessive deformation of the bellows possibly resulting from high pressure of the gas, which pressure may be established and suitably regulated in advance by suitable and effective filling means.

Having thus disclosed the invention, what is claimed is:

1. In a high tension cable a chain of adjacent rigid protective containers of substantially cylindrical form, openings in said containers, a plurality of elastic gas-filled bellows, said bellows having one end closed and movable freely to expand and contract inside said containers, the other end being secured to a transverse wall of said housing and provided with sealing elements which are secured by welding upon the filling of each of said bellows under a desired gas pressure, and abutments for limiting said expanding movement of the bellows.

2. In a high tension fluid-filled cable a flexible chain of adjacent rigid and substantially cylindrical containers, openings in said containers, means for maintaining said containers in axial alignment and a plurality of elastic gas-filled bellows, one end of said bellows being closed and freely movable to expand and contract inside of a container, while the other end is secured to an end wall of the same container and is sealed under a desired gas pressure, sealing elements secured by welding, and abutments for limiting said expanding movement of the bellows.

3. In a high tension cable according to claim 2, an arrangement wherein said chain of rigid containers forms a central supporting core of a strand of conducting wires constituting a stranded conductor, whereby said containers are held in axial alignment and the manufacture of said conductor is facilitated.

4. In a high tension cable according to claim 2, an arrangement wherein the adjacent rigid containers being in the form of cylindrical boxes comprise additional linking means in the form of cooperating bosses and recesses.

5. In a high tension cable according to claim 2, a stranded conductor, said chain comprising a series of rigid containers in the form of cylindrical adjacent boxes located in the axis of said stranded conductor and held in alignment by the wires of this conductor, and additional linking means in the form of cooperating bosses and recesses.

6. In a high tension cable according to claim 2, an arrangement wherein the external cylindrical surface of said rigid containers is cambered and their end walls are convex to facilitate the flexion of the cable.

7. In a high tension cable according to claim 2, a flexible pipe enclosing said chain of rigid containers and of gas-filled bellows, said pipe being twisted into cable with a plurality of insulated conductors.

References Cited in the file of this patent

UNITED STATES PATENTS

| | | |
|---|---|---|
| 1,870,902 | Giesler | Aug. 9, 1932 |
| 2,336,040 | Scott et al. | Dec. 7, 1943 |
| 2,536,628 | Denisoff | Jan. 2, 1951 |

FOREIGN PATENTS

| | | |
|---|---|---|
| 347,819 | Great Britain | May 7, 1931 |
| 567,199 | Germany | Dec. 29, 1932 |